Patented Oct. 27, 1953

2,657,188

UNITED STATES PATENT OFFICE 2,657,188

OLEFIN-VINYL ACETATE COPOLYMERS AND VINYL RESINS PLASTICIZED THEREWITH

Walter A. Denison, South Charleston, and William N. Stoops, Charleston, W. Va., assignors, by mesne assignments, to Union Carbide and Carbon Corporation, a corporation of New York No Drawing. Application October 2, 1948, Serial No. 52,586

13 Claims. (Cl. 260—31.2)

The production of vinyl chloride resins has doubled many times over the past decade, and the productive capacity for resins of this type is currently being enlarged. Associated with this growth of vinyl chloride resins has been an accelerated demand for plasticizers, as it is estimated that nearly one pound of plasticizer is used for each two pounds of vinyl chloride resins sold. The bulk of this plasticizer requirement has heretofore been satisfied with esters of phthalic acid, in particular, dioctyl phthalate. However, the vapor pressure of the phthalate esters is not as low as would be desirable for best performance as plasticizers. In addition, phthalic anhydride, which is required in making phthalate esters, is relatively expensive. Thus, there is a real need for better and cheaper plasticizers for vinyl chloride resins. Mixtures of complex aromatic hydrocarbons have been offered at reasonable prices for this purpose, but are dark in color and have poor compatibility with the vinyl chloride resins.

We have succeeded in developing potentially low cost plasticizers for vinyl chloride resins which are comparable in softening ability to dioctyl phthalate, and which have the advantage of reduced volatility. We have discovered that, while neither polyethylene nor polyvinyl acetate are compatible with vinyl chloride resins, a restricted number of copolymers of vinyl acetate with ethylene and other olefins are compatible with vinyl chloride resins to form elastomeric compositions. The basic raw materials required for our new plasticizers are ethylene and other olefins, acetylene, and acetic acid, all of which are available in large quantities at low cost. As these raw materials are the same as those required for making vinyl resins, our invention makes possible the integrated production of both vinyl chloride resins and plasticizers therefor.

We have found that both the composition and the average molecular weight of olefin-vinyl acetate copolymers greatly affect the compatibility of these copolymers with vinyl chloride resins. We have found that only those copolymers of olefins with vinyl acetate which are liquid and which have average molecular weights below 1200 and which contain from 60 to 80% vinyl acetate by weight are compatible with vinyl chloride resins to form flexible compositions. Thus, the previously known solid copolymers of ethylene with vinyl acetate are completely incompatible with vinyl chloride resins. To be suitable as plasticizers for vinyl chloride resins the average molecular weight of the copolymers should be at least 350, as copolymers lower in molecular weight than this are extracted by oil and water from plasticized compositions to an undesired degree. We have experimentally determined that any olefin containing from two to four carbon atoms, including ethylene, propylene, isobutylene, butene-1, and butene-2, will copolymerize with vinyl acetate under appropriate conditions to be described hereinafter to form useful liquid plasticizers for vinyl chloride resins. However, copolymers of vinyl acetate with ethylene or propylene or mixtures of the two are preferred, and with each of these olefins, a preferred composition exists. For ethylene-vinyl acetate copolymers, the preferred composition is 62 to 75% vinyl acetate and an average molecular weight of 500 to 1200, and for propylene-vinyl acetate copolymers the preferred composition is 64 to 75% vinyl acetate, and an average molecular weight of 500 to 1100. These preferences are based on the facts that copolymers containing the maximum amount of ethylene or propylene within the range of 20 to 40% olefin tend to exude slightly from plasticized vinyl chloride resin compositions on long standing, and such compositions containing copolymers having the maximum amount of vinyl acetate within the range of 60 to 80% vinyl acetate are not as flexible at low temperatures as those compositions containing copolymers having a lesser amount of vinyl acetate within said range.

The vinyl acetate-olefin copolymers of this invention are made under conditions which assure the production of products having a low molecular weight. To reduce the molecular weight of the copolymers, substantial amounts, i. e. one-half to ten times the amount of total monomers, of solvents, such as acetone, methyl ethyl ketone or ethyl acetate, are included in the polymerization charge. Also, compounds which act as terminators for a growing polymer chain, such as aldehydes or mercaptans, may be added. The use of higher polymerization temperatures within the range of 75° to 300° C. also favors the production of lower molecular weight copolymers, the preferred temperature range being 150° C. to 250° C. High polymerization pressures increase the rate of polymerization but are not required for the production of liquid polymers. Pressures as low as 3000 p. s. i. or as high as 35,000 p. s. i. may be used.

The vinyl acetate copolymerizes at a faster rate than the olefin. This means, for instance, that to obtain an olefin-vinyl acetate copolymer containing about 60 to 80% vinyl acetate, the monomer mixture polymerized should contain about 40 to 60% by weight of vinyl acetate, and the polymerization should be carried to a point well short of completion.

The monomers to be polymerized may be emulsified or suspended in water, but this is not essential. Also, continuous or batch polymerization methods may be utilized. The presence of a catalyst is necessary for best results, and any of the usual peroxide type catalysts may be employed for this purpose in amounts from 0.1% to 3% by weight of the monomers. Suitable catalysts include dibenzoyl peroxide, tertiary butyl perbenzoate, tertiary butyl hydro-peroxide, hydrogen peroxide and potassium persulfate. At temperatures of 150° C. or higher, molecular oxygen may be used.

Any of the typical vinyl chloride resins may be plasticized with the olefin-vinyl acetate copolymers of this invention in an amount from 10% to 60% by weight of the total of resin plus plasticizer. The vinyl chloride resins include polyvinyl chloride, and copolymers of vinyl chloride with vinyl esters, such as vinyl acetate; with acrylate esters, such as methyl and ethyl acrylate; with fumarate and maleate esters, such as diethyl fumarate; and with vinylidene chloride, vinyl fluoride, ethylene and other polymerizable compounds containing a single double bond, as well as copolymers of vinyl chloride, vinyl acetate and maleic acid, and partially hydrolyzed copolymers of vinyl chloride with vinyl acetate. In all these copolymers, the vinyl chloride predominates and it is usually 85 to 99% of the copolymer by weight. The olefin-vinyl acetate copolymers are also compatibile with other vinyl resins, such as polyvinyl acetate or polyvinyl butyral resins.

Only the relatively low molecular weight copolymers of olefins with vinyl acetate with the specified content of vinyl acetate are of interest as plasticizers for vinyl chloride resins. This is because the flexibility at low temperatures of vinyl chloride resins plasticized with these copolymers increases with decreasing molecular weight of the copolymers. Also the amount of plasticizer required to produce a given degree of elasticity, decreases with decreasing molecular weight of the plasticizer. On the other hand, the resistance of the plasticized compositions to extraction by oils and water increases with increasing molecular weight of the copolymer. There is thus an optimum molecular weight for copolymers of vinyl acetate with each olefin at which it functions best as a plasticizer for these resins. The tables to follow illustrate the effect of the molecular weight of the plasticizer on the properties of vinyl chloride-vinyl acetate copolymers containing 96.1% vinyl chloride and having an intrinsic viscosity of 1.15 plasticized with certain olefin-vinyl acetate copolymers of this invention.

TABLE A

Properties of vinyl chloride resin plasticized with ethylene-vinyl acetate copolymers

| Ethylene-Vinyl Acetate Copolymer: | | | | | | | |
|---|---|---|---|---|---|---|---|
| Percent Vinyl acetate | 61 | 62 | 62 | 63 | 63 | 64 | 62 |
| Mol. Wt | 285 | 327 | 375 | 449 | 506 | 680 | 1,070 |
| Plastic Composition: | | | | | | | |
| Percent Plasticizer (a) | 34.8 | 34.0 | 35.0 | 37.0 | 40.1 | 42.0 | 46.9 |
| Tensile strength, p. s. i | 2,760 | 2,800 | 2,750 | 2,640 | 2,480 | 2,390 | 2,350 |
| Elongation, percent | 320 | 325 | 325 | 330 | 340 | 320 | 310 |
| Stiffness, p. s. i. ASTM D-747-43T | 760 | 850 | 775 | 600 | 450 | 440 | 410 |
| $T_F$ [b], ° C | −27.3 | −22.0 | −18.0 | −18.8 | −18.6 | −14.8 | −10.0 |
| Extraction by oil, percent (c) | 8.6 | 10.0 | 7.7 | 8.2 | 6.7 | 4.2 | 1.8 |
| Extraction by water, percent (c) | 10.8 | 8.7 | 5.9 | 5.5 | 2.4 | 1.1 | 0.2 |

TABLE B

Properties of vinyl chloride resin plasticized with propylene-vinyl acetate copolymers

| Propylene-Vinyl Acetate Copolymer: | | | |
|---|---|---|---|
| Percent Vinyl acetate | 67 | 67 | 67 |
| Mol. Wt | 340 | 560 | 1,150 |
| Plastic Composition: | | | |
| Plasticizer, percent (a) | 40 | 46.9 | 57.5 |
| $T_F$, ° C. (b) | −23.7 | −10.3 | +4.5 |
| Extraction by oil, percent (c) | 11.8 | 6.9 | 0.0 |
| Extraction by water, percent (c) | 13.0 | 6.4 | 0.4 |

[a] The amount required to produce an elongation of 100% at a load of 1000 p. s. i. applied at a rate of 800 p. s. i. per minute as described by Reed, Journal of Polymer Science, vol. II, No. 2, 118–119 (1947).
[b] See Clash and Berg, Ind. Eng. Chem. 34, 1218–1222 (1942). The Flex Temperature $T_F$ is the temperature at which the plastic is no longer readily flexible as measured by this test.
[c] These values are the percent loss in weight of a 0.004 in. film of the plasticized composition during immersion in water and oil at 25° C. for a period of 10 days.

The examples to follow illustrate the invention.

EXAMPLE 1

A mixture of ethylene (41.2%), vinyl acetate (42.2%) and carbon tetrachloride (16.6%) was pumped from a storage cylinder to a stainless steel pressure bomb having a capacity of 500 cc. which had previously been charged with 350 cc. of water and 0.5 gm. of ammonium persulfate. The pressure in the bomb was brought to 4400 p. s. i. at 95° C. After 1.5 hours at this temperature the pressure had fallen to 2900 p. s. i. A viscous liquid copolymer weighing 18.8 gms. (representing a yield of about 13%), having a mol. wt. of 1000, and a vinyl acetate content of 72%, was isolated from the reaction mixture.

A mixture of 40 parts of this copolymer was milled with 60 parts of a vinyl chloride-vinyl acetate copolymer containing 96.1% vinyl chloride, and a clear, flexible sheet was obtained.

EXAMPLE 2

A steel gas cylinder was evacuated and charged as follows:

900 gm. vinyl acetate
3600 gm. acetone
30 gm. aqueous hydrogen peroxide (30%)
900 gm. commercial ethylene The liquid phase of this mixture was fed to a high-pressure pump, by means of which a portion of the mixture was compressed to 30,000 p. s. i. in an 18-8 stainless steel reactor of 32 cc. capacity. The reactor was maintained at a temperature of 186° C. After five minutes exposure to this temperature and pressure, the contents of the reactor were discharged. The process of filling and emptying the reactor was repeated a total of forty-eight times. The composite copolymer obtained was freed of volatile matter by stripping at reduced pressure. The product isolated in this fashion was a pale yellow liquid weighing 269 gm. Combustion analysis of this product showed that it contained by weight 65.5% carbon and 9.6% hydrogen, corresponding to 33% ethylene and 67% vinyl acetate by weight. A molecular weight determination by the Menzies-Wright method, using acetone as solvent, gave a value of 680.

A mixture of 41.6 parts of this vinyl acetate-ethylene copolymer with 56.4 parts of a vinyl chloride-acetate copolymer containing 96.1% vinyl chloride and 2 parts of dibutyl tin dilaurate was sheeted out on a hot roll-mill. The plasticized sheet was pale yellow, flexible and substantially clear.

EXAMPLE 3

A charge was made by mixing the following materials in a stainless steel cylinder of 13.7 lb. capacity:

1155 gm. vinyl acetate
4200 gm. acetone
70 gm. 30% hydrogen peroxide
945 gm. ethylene
21 gm. acetaldehyde This mixture was fed to a high pressure pump which forced it through a tubular reactor $\frac{3}{16}''$ I. D., with a heated section about 36 feet long. The temperature was maintained at 180° C., and the pressure at 30,000 p. s. i. The duration of the run was 58 minutes. Volatile materials were removed from the viscous copolymer formed by stripping it at 100° C. and decreasing pressure, finally at 1 mm. The amount of the copolymer thus recovered was 777 gm. Combustion analysis showed that it contained 65.1% carbon, corresponding to 69% vinyl acetate. The molecular weight was 600 as determined by the Menzies-Wright method in acetone.

A milled sheet of 58 parts of vinyl chloride-acetate copolymer containing 96% vinyl chloride, 40 parts of the above ethylene-vinyl acetate copolymer, and 2 parts of dibutyl tin dilaurate was clear, flexible and pale in color. Similarly, after mixing 54.5 parts of polyvinyl chloride, having an intrinsic viscosity of 1.4, 45 parts of the above-described vinyl acetate-ethylene copolymer, and 0.5 part of dibutyl tin maleate on a hot roll-mill a nearly clear, pale yellow sheet was obtained. Both of these milled sheets were tough, flexible, and somewhat extensible. A milled sheet consisting of 67.5 parts of a vinyl chloride-vinyl acetate copolymer containing 89.9% of vinyl chloride and having an intrinsic viscosity of 0.87, 32 parts of the ethylene-vinyl acetate copolymer, and 0.5 part of dibutyl tin maleate was nearly clear and colorless, and slightly flexible.

EXAMPLE 4

The polymerization procedure of Example 3 was repeated and the product was stripped of lower molecular weight fractions by passing it several times through a molecular still of the falling film type. The final pass through the still was carried out at a temperature of 117° C. and about 4 microns pressure. The still residue amounted to one-half the original copolymer and had a molecular weight of 920 by the Menzies-Wright method and it contained 65.3% carbon by combustion corresponding to 68.5% vinyl acetate. The specific gravity, 30/20° C., was 1.025 and the refractive index $n_D^{30}$ was 1.4591.

EXAMPLE 5

The following charge was prepared in a gas cylinder.

305 gm. vinyl acetate
1208 gm. acetone
10 gm. 30% aqueous hydrogen peroxide
298 gm. ethylene The polymerization of this mixture was carried out as in Example 2. The yield of copolymer was 323 gm. (about 50%), which contained by analysis 63% vinyl acetate, and had a molecular weight of 650. It was a pale yellow liquid, $n_D^{30}$ 1.4565.

The copolymer was subjected to molecular distillation at different temperatures and pressures, whereby it was separated into the following fractions; some material being lost mechanically.

| Fr. No. | Temp., °C. | Pressure, Microns | Wt. Percent of Original Copolymer | Molecular Weight | Percent Vinyl Acetate | $n_D^{30}$ |
|---|---|---|---|---|---|---|
| 1 | 80 | 50 | 4.9 | 285 | 61 | 1.4409 |
| 2 | 100 | 14 | 4.5 | 327 | 62 | 1.4459 |
| 3 | 125 | 10 | 3.6 | 375 | 62 | 1.4485 |
| 4 | 149 | 5–10 | 9.0 | 449 | 63 | 1.4511 |
| 5 | 183 | 4–5 | 10.4 | 506 | 63 | 1.4551 |
| 6 | 207 | 7–11 | 8.0 | 680 | 64 | 1.4571 |
| 7 | residue | | 46.0 | 1,070 | 62 | 1.4562 |

The above results show that the copolymers formed are fairly uniform in vinyl acetate content throughout the range of molecular weights present. It is also noteworthy that the vinyl acetate content of the copolymer is higher than the vinyl acetate content of the mixture of monomers charged, indicating that the vinyl acetate copolymerizes at a faster rate than the ethylene.

The effectiveness of these fractions as plasticizers for vinyl chloride resins is tabulated in Table A.

EXAMPLE 6

The copolymers of Examples 2 and 4, and fraction 6 of Example 5 were evaluated as plasticizers for a vinyl chloride-vinyl acetate copolymer containing 96% vinyl chloride and having an intrinsic viscosity of 1.1. The results are tabulated below.

| | | | |
|---|---|---|---|
| Ethylene-vinyl Acetate Copolymers: | | | |
| Percent Vinyl Acetate | 64 | 67 | 68.5 |
| Mol. Wt. | 680 | 680 | 920 |
| Plastic Composition: | | | |
| Percent Plasticizer [1] | 42.0 | 41.6 | 42.4 |
| Tensile Strength, p. s. i. | 2,390 | 2,425 | 2,300 |
| Elongation, percent | 320 | 315 | 325 |
| Stiffness, p. s. i. ASTM D-747-43T | 440 | 510 | 485 |
| $T_F$, °C. [1] | −14.8 | −10.7 | −9 |
| Extraction by oil, percent [1] | 4.2 | 2.7 | 4.4 |
| Extraction by water, percent [1] | 1.1 | 2.3 | 2.1 |

[1] See notes—Tables A and B.

These results show that within a narrow range of molecular weights of the ethylene-vinyl acetate copolymers, the flexibility at low temperatures of vinyl chloride resins plasticized therewith increases with decreasing vinyl acetate content of the copolymer.

EXAMPLE 7

A series of copolymers of vinyl acetate with propylene were prepared by the method of Example 2. The temperature was 190° C. and the pressure varied from 10,000 to 35,000 p. s. i. The results are tabulated below:

| Charge, Parts by Weight | | | | Copolymer Properties | |
| --- | --- | --- | --- | --- | --- |
| Vinyl Acetate | Propylene | Acetone | $H_2O_2$ | Percent Vinyl Acetate | Mol. Wt. |
| 40 | 60 | 200 | 1 | 62.5 | 710 |
| 50 | 50 | 50 | 2 | 66 | 900 |
| 60 | 40 | 200 | 2 | 75 | 670 |

These results show that vinyl acetate copolymerizes at a faster rate than propylene, and that the molecular weight of the product can be controlled by regulating the amount of diluent used.

EXAMPLE 8

A series of copolymers of vinyl acetate with four carbon olefins were prepared following the conditions and method of Example 2. The results are tabulated below:

| Charge, Parts by Weight | | | | | Copolymer Properties | |
| --- | --- | --- | --- | --- | --- | --- |
| Vinyl Acetate | Isobutylene | Butene-1 | Acetone | Catalyst | Percent Vinyl Acetate | Mol. Wt. |
| 40 | 60 | ---- | 200 | a 1 | 64 | 590 |
| 50 | 50 | ---- | 200 | b 1 | 66 | 935 |
| 55 | 45 | ---- | 200 | b 1 | 69 | 895 |
| 50 | ---- | 50 | 200 | b 2 | 71 | 530 | a Hydrogen peroxide.
b t-Butyl hydroperoxide.

EXAMPLE 9

Several copolymers of vinyl acetate with propylene and with isobutylene were evaluated as plasticizers for a vinyl chloride-vinyl acetate copolymer having a vinyl chloride content of 96% and an intrinsic viscosity of 1.1. The results are tabulated below:

| Olefin-Vinyl Acetate Copolymer: | | | | |
| --- | --- | --- | --- | --- |
| Percent Vinyl Acetate | 63 | 69.5 | 68 | 74 |
| Percent Propylene | 37 | 30.5 | ---- | ---- |
| Percent Isobutylene | ---- | ---- | 32 | 26 |
| Mol. Wt. | 610 | 800 | 620 | 660 |
| Plastic Composition: | | | | |
| Percent Plasticizer | a 48.4 | a 51.4 | b 47.5 | c 47.5 |
| Tensile Strength, p. s. i. | 2,110 | 2,140 | 1,950 | 2,200 |
| Elongation, percent | 325 | 290 | 245 | 275 |
| Stiffness, p. s. i., ASTM D-747-43T | 600 | 475 | 480 | 725 |
| $T_F$ °C | −5 | −5 | −7 | −0.5 |
| Extraction by oil, percent | 2.5 | 1.3 | 2.8 | 1.4 |
| Extraction by water, percent | 2.2 | 2.4 | 2.2 | 1.8 | a See Note a Tables A and B.
b Percent of plasticizer to give an elongation of 100% at 1,125 p. s. i.
c Percent of plasticizer to give an elongation of 100% at 1,240 p. s. i.

EXAMPLE 10

A copolymer of vinyl acetate with a mixture of olefins was prepared by polymerizing the following charge:

Parts by weight
Vinyl acetate _____ 50
Ethylene _____ 42
Propylene _____ 3
Hydrogen peroxide _____ 1
Acetone _____ 100

The polymerization was carried out at 180° C. at 19,000 p. s. i.; the reaction time being 0.78 minute. A copolymer containing 65% vinyl acetate and having a molecular weight of 870 was obtained in a yield of 5%. Upon milling 40 parts of this copolymer with 59.5 parts of a vinyl chloride-vinyl acetate copolymer, containing 96.3% vinyl chloride and having an intrinsic viscosity of 1.10, and 0.5 part of dibutyl tin laurate maleate, a flexible sheet was obtained which was clear and pale in color.

What is claimed is:

1. A liquid copolymer of vinyl acetate with a mono-olefin having from two to four carbon atoms, said copolymer containing from 60 to 80% by weight combined vinyl acetate and having an average molecular weight from 350 to 1200.

2. A liquid copolymer of vinyl acetate with ethylene containing from 62 to 75% by weight combined vinyl acetate and having an average molecular weight from 500 to 1200.

3. A liquid copolymer of vinyl acetate with propylene containing from 64 to 75% combined vinyl acetate and having an average molecular weight from 500 to 1100.

4. A liquid copolymer of vinyl acetate with isobutylene containing from 64 to 75% vinyl acetate, and having an average molecular weight from 500 to 1100.

5. Process for making liquid copolymers of vinyl acetate with a mono-olefin containing from two to four carbon atoms which comprises forming a mixture containing from 40 to 60 parts by weight of vinyl acetate, and from 40 to 60 parts by weight of said mono-olefin, an organic solvent in an amount from one-half to ten times the total amount by weight of the vinyl acetate and mono-olefin, and a peroxidic polymerization catalyst in an amount from 0.1 to 3% by weight of the total amount of vinyl acetate and mono-olefin, heating the mixture thus formed under a pressure of 3000 to 35,000 p. s. i. at a temperature of 75° C. to 300° C., and recovering a liquid copolymer of vinyl acetate and said mono-olefin containing from 60 to 80% vinyl acetate and having an average molecular weight from 350 to 1200.

6. A plastic composition comprising a vinyl chloride resin containing from 85 to 100% combined vinyl chloride and a plasticizer in an amount from 10% to 60% by weight of the total of resin plus plasticizer, said plasticizer being the composition defined in claim 1.

7. A plastic composition comprising a vinyl chloride resin containing from 85 to 100% combined vinyl chloride and a plasticizer in an amount from 10% to 60% by weight of the total of resin plus plasticizer, said plasticizer being the composition defined in claim 2.

8. A plastic composition comprising a vinyl chloride resin containing from 85 to 100% combined vinyl chloride and a plasticizer in an amount from 10% to 60% by weight of the total of resin plus plasticizer, said plasticizer being the composition defined in claim 3.

9. A plastic composition comprising a vinyl chloride resin containing from 85 to 100% combined vinyl chloride and a plasticizer in an amount from 10% to 60% by weight of the total of resin plus plasticizer, said plasticizer being the composition defined in claim 4.

10. A plastic composition comprising a copolymer of vinyl chloride with vinyl acetate containing from 85 to 99% vinyl chloride and a plasticizer in an amount from 10% to 60% by weight of the total of copolymer plus plasticizer, said plasticizer being the composition defined in claim 2.

11. A normally liquid copolymer of ethylene with vinyl acetate containing about 60% vinyl acetate and having a molecular weight of about 700.

12. A normally liquid copolymer of vinyl acetate with ethylene containing from about 60% to about 80% by weight of combined vinyl acetate.

13. Process for making normally liquid copolymers of vinyl acetate and ethylene, which comprises forming a mixture of ethylene, vinyl acetate, a peroxidic polymerization catalyst, and an organic solvent, said solvent serving to reduce the molecular weight of the copolymer to a value at which the copolymer is normaly a liquid and being present in amounts from 100% to 1000% of the weight of vinyl acetate, heating the mixture thus formed under superatmospheric pressures and at an elevated temperature, and recovering a liquid copolymer of vinyl acetate and ethylene containing from about 60% to about 80% vinyl acetate.

WALTER A. DENISON.
WILLIAM N. STOOPS.

References Cited in the file of this patent

UNITED STATES PATENTS

| Number | Name | Date |
|---|---|---|
| 2,182,528 | Stamatoff | Dec. 5, 1939 |
| 2,185,297 | Gloor | Jan. 2, 1940 |
| 2,315,503 | Crowell et al. | Apr. 6, 1943 |
| 2,331,328 | Kyrides | Oct. 12, 1943 |
| 2,414,311 | Larson | Jan. 14, 1947 |
| 2,436,256 | Hanford | Feb. 17, 1948 |
| 2,449,489 | Larson | Sept. 14, 1948 |
| 2,490,550 | Sermattei | Dec. 6, 1949 |